United States Patent [19]

Essery

[11] 3,928,334
[45] Dec. 23, 1975

[54] PROCESS FOR THE PRODUCTION OF CEFAMANDOLE

[75] Inventor: John Michael Essery, Fayetteville, N.Y.

[73] Assignee: Bristol-Myers Company, New York, N.Y.

[22] Filed: June 6, 1974

[21] Appl. No.: 476,972

[52] U.S. Cl............................ 260/243 C; 424/246
[51] Int. Cl.²....................................... C07D 501/20
[58] Field of Search ................................ 260/243 C

[56] References Cited
UNITED STATES PATENTS
3,855,213   12/1974   Dunn et al. ..................... 260/243 C OTHER PUBLICATIONS
J. Amer. Chem. Soc., Vol. 90, pp. 1651–1652 (1968).

*Primary Examiner*—Nicholas S. Rizzo
*Attorney, Agent, or Firm*—Herbert W. Taylor, Jr.

[57] ABSTRACT

Cefamandole is produced by the consecutive steps of
a. mixing substantially equimolar weights of N-ethoxycarbonyl-2-ethoxy-1,2-dihydroquinoline and of a derivative of D-mandelic acid having the formula

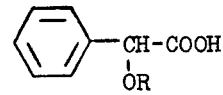

wherein the hydroxyl blocking group R represents dichloroacetyl, silyl, tetrahydropyranyl or formyl is an organic solvent;

b. adding thereto, preferably slowly, a solution containing substantially the same number of moles of 7-amino-3-(1-methyltetrazol-5-yl)thiomethyl-3-cephem-4-carboxylic acid or a salt or an easily hydrolyzed Schiff base thereof to produce the intermediate acid having the formula

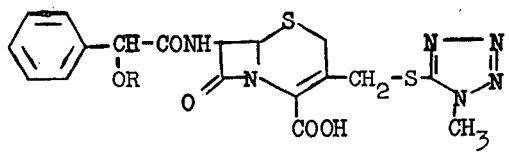

or a salt thereof and c. removing said hydroxyl blocking group R by conventional chemical methods to produce said cefamandole or salt thereof.

1 Claim, No Drawings

PROCESS FOR THE PRODUCTION OF CEFAMANDOLE

SUMMARY OF THE INVENTION

There is provided by the present invention the process for the preparation of the compound cefamandole having the D-configuration in the sidechain and the formula

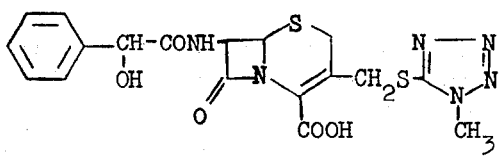

or a salt thereof which comprises the consecutive steps of
  a. mixing substantially equimolar weights of N-ethoxycarbonyl-2-ethoxy-1,2-dihydroquinoline and of a derivative of D-mandelic acid having the formula

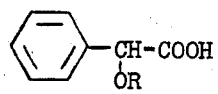

wherein the hydroxyl blocking group R represents dichloroacetyl, silyl and preferably trimethylsilyl, tetrahydropyranyl or, preferably, formyl in an anhydrous organic solvent such as benzene, ethanol or preferably tetrahydrofuran, at room temperature or below and preferably at about 5° C. for a short period of time;
  b. adding thereto, preferably slowly, a solution at about the same temperature in a solvent, preferably aqueous tetrahydrofuran, containing substantially the same number of moles of a tertiary amine, preferably a tertiary alkylamine such as triethylamine and substantially the same number of moles of 7-amino-3-(1-methyltetrazol-5-yl)thiomethyl-3-cephem-4-carboxylic acid or a salt or an easily hydrolyzed Schiff base, as with benzaldehyde, thereof to produce the intermediate acid having the formula

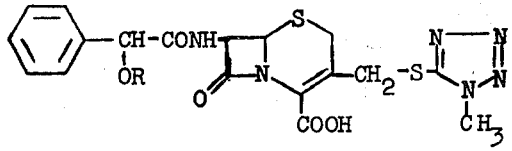

or a salt thereof wherein R has the meaning set out above; and
  c. removing said hydroxyl blocking group R by conventional chemical methods to produce said cefamandole or salt thereof.

In preferred embodiments of the present invention R represents formyl which is removed in step C by treatment with aqueous alkali such as aqueous sodium bicarbonate or R represents dichloroacetyl which is removed in step C by alkaline hydrolysis, preferably at about pH 9–10, or R represents trimethylsilyl which is removed in step C by exposure to aqueous acid.

BACKGROUND OF THE INVENTION a. Field of the Invention

This invention relates to a chemical process for the production of the antibacterial agent cefamandole which is a known member of the cephalosporin family.

b. Description of the Prior Art

Cefamandole has the structure

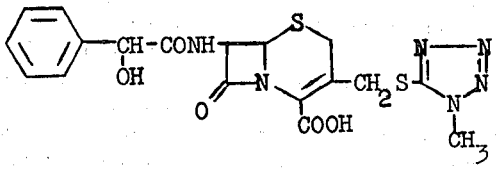

having the D configuration in the 7-sidechain. It has been reported, for example, (as "CMT") by Wick et al., Antimicrobial Ag. Chemo. 1(3), 221–234 (1972), by Ryan in Example 4 of U.S. Pat. No. 3,641,021, by Greene in France Pat. No. 73.10112 (corresponding to Farmdoc 60,837U, Netherlands Pat. No. 7303917, South Africa Pat. No. 73/1644), by Guarini as Example 1 in U.S. Pat. No. 3,796,801.

The coupling agent N-ethoxycarbonyl-2-ethoxy-1,2-dihydroquinoline (EEDQ) is described in J. Amer. Chem. Soc. 90, 823–824 and 1652–1653 (1968) and U.S. Pat. No. 3,455,929.

These examples are given in illustration of, but not in limitation of, the present invention. All temperatures are in degrees Centigrade.

DESCRIPTION OF THE PREFERRED EMBODIMENTS

EXAMPLE 1

A solution containing 1.80 g. (.01 mole) of O-formyl-D-(—)-mandelic acid and 2.72 g. (.011 mole) of N-ethoxycarbonyl-2-ethoxy-1,2-dihydroquinoline (Aldrich) in 20 ml. of dry tetrahydrofuran (THF) was stirred 0.5 hour at room temperature. It was then cooled to 5° C. and to it was added in a thin stream a cold (5°) solution of 3.28 g. (.01 mole) of 7-amino-3-(1-methyltetrazol-5-yl)thiomethyl-3-cephem-4-carboxylic acid and 1.01 g. (.01 mole) of triethylamine in 30 ml. of 50% aqueous tetrahydrofuran. The mixture was stirred without external cooling for 4 hours. The THF was removed under reduced pressure and the aqueous residue was filtered through diatomaceous earth ("SUPERCEL") and the filtrate then extracted twice with 25 ml. each of ethyl acetate. The extracts were washed with 10 ml. of saturated aqueous NaHCO₃ solution which was then added to the aqueous phase remaining from the ethyl acetate extraction to give solution A. The ethyl acetate phase was washed with water, dried with MgSO₄ and evaporated to leave 1.1 g. of oil which was discarded. The aqueous solution A was acidified to pH 2.5 with 6 N HCl and extracted three times with 50 ml. each of ethyl acetate. The combined extracts were washed with 15 ml. water, dried over MgSO₄ and evaporated to leave as a foam 3.5 g. of the desired product, O-formylcefamandole, having the formula

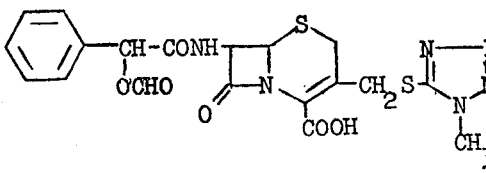

About 3.5 g. of that O-formylcefamandole dissolved in 40 ml. water containing 3.2 g. sodium bicarbonate was stirred 3 hours at room temperature. The solution was then diluted with 20 ml. ice-water, acidified to pH 2.5 with 6 N HCl and extracted three times with 50 ml. each of ethyl acetate. The combined extracts were washed twice with 20 ml. each of water, dried over MgSO₄ and evaporated to give the product cefamandole as a yellow foam which was dissolved in 50 ml. absolute ethanol and filtered. The filtrate was stirred while a solution of 1.09 g. (.008 mole) of sodium acetate trihydrate in 6 ml. absolute methanol was added dropwise producing a thick slurry which was stirred 0.5 hour at 0°–5°; the product, sodium cefamandole, was then collected by filtration, washed with ethanol, dried in vacuo and found to weigh 2.1 g. (44% yield). NMR showed only traces of ethyl acetate and O-formylcefamandole as impurities.

EXAMPLE 2

Synthesis of O-Dichloroacetyl-cefamandole and its Transformation to Cefamandole

A solution containing 2.63 g. (.01 mole) of D-(−)-dichloroacetylmandelic acid and 2.72 g. (.011 mole) of 1-ethoxycarbonyl-2-ethoxy-1,2-dihydroquinoline (Aldrich) in 20 ml. of dry tetrahydrofuran (THF) was stirred 0.5 hour at room temperature and was then cooled to 5° C. To the stirred solution there was added in a thin stream a solution of 3.28 g. (.01 mole) of 7-amino-3-(1-methyltetrazol-5-yl)thiomethyl-3-cephem-4-carboxylic acid and 1.01 g. (.01 mole) of triethylamine in a mixture of 10 ml. THF and 30 ml. water. The mixture was stirred for 4 hr. without external cooling — after about 0.5 hr. a thick slurry had formed and this was diluted with 30 ml. THF. The reaction mixture was filtered through diatomaceous earth ("SUPER-CEL") and the THF was removed from the filtrate under reduced pressure. The aqueous residue was extracted with ethyl acetate to remove quinoline. The ethyl acetate was extracted with 10 ml. of saturated aqueous NaHCO₃ solution and this extract was added to the previous aqueous phase. Then 6 N HCl was added with stirring to pH 2.5 and the product, O-dichloroacetylcefamandole, was extracted into ethyl acetate (3 × 50 ml.). The ethyl acetate extracts were combined, washed with 25 ml. water, dried over magnesium sulfate and evaporated to dryness to give 2.5 g. of O-dichloroacetyl-cefamandole as a yellow foam.

That product was dissolved in 20 ml. of saturated aqueous NaHCO₃ solution and stirred 1 hr. at room temperature to effect the transformation to sodium cefamandole by removal of the blocking group. The solution was then washed with 20 ml. ethyl acetate and the aqueous phase was acidified to pH 2.5 with 6 N HCl and extracted with three 50 ml. portions of ethyl acetate. These extracts were combined, washed with 25 ml. water, dried over anhydrous MgSO₄ and evaporated to give 1.6 g. of cefamandole as a yellow gum. This was dissolved in 30 ml. of absolute ethanol and treated with a solution of 0.68 g. (.005 mole) of sodium acetate trihydrate in 5 ml. methanol. The resulting slurry was cooled to 0° C. and the product, sodium cefamandole, was collected by filtration, washed with ethanol, dried in vacuo and found to weigh 0.6 g.

Thin layer chromatography showed one zone at the same $R_f$ as that of standard sodium cefamandole (silica gel with n-butanol-acetic acid-water 4:1:1 visualized by either ultraviolet light or iodine). Infrared and n.m.r. spectra also showed the identity with sodium cefamandole.

I claim:
1. The process for the preparation of the compound cefamandole having the D-configuration in the side-chain and the formula

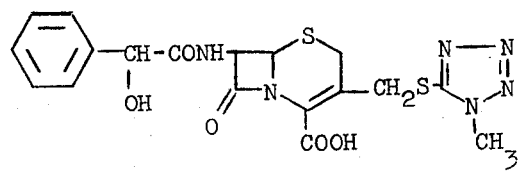

which comprises the consecutive steps of
a. mixing substantially equimolar weights of N-ethoxycarbonyl-2-ethoxy-1,2-dihydroquinoline and of a derivative of D-mandelic acid having the formula

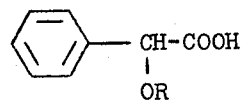

wherein the hydroxyl blocking group R represents dichloroacetyl or formyl in anhydrous tetrahydrofuran at room temperature or below for a short period of time;
b. adding slowly thereto a solution at about the same temperature in aqueous tetrahydrofuran containing substantially the same number of moles of triethylamine as a tertiary amine and substantially the same number of moles of 7-amino-3-(1-methyltetrazol-5-yl)thiomethyl-3-cephem-4-carboxylic acid to produce the intermediate acid having the formula

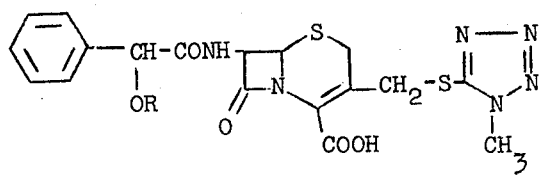

thereof wherein R has the meaning set out above; and
c. removing said hydroxyl blocking group R by reaction with aqueous sodium bicarbonate to produce said cefamandole.

* * * * *